United States Patent
Noguchi et al.

(10) Patent No.: US 7,551,356 B2
(45) Date of Patent: Jun. 23, 2009

(54) ANTI-REFLECTION MICROSTRUCTURE, ANTI-REFLECTION MOLD BODY, AND METHOD OF MANUFACTURING THE SAME

(75) Inventors: Yuji Noguchi, Yokosuka (JP); Takayuki Fukui, Yokohama (JP)

(73) Assignee: Nissan Motor Co., Ltd., Yokohama-Shi (JP)

( * ) Notice: Subject to any disclaimer, the term of this patent is extended or adjusted under 35 U.S.C. 154(b) by 93 days.

(21) Appl. No.: 11/723,391

(22) Filed: Mar. 19, 2007

(65) Prior Publication Data
US 2007/0216997 A1 Sep. 20, 2007

(30) Foreign Application Priority Data
Mar. 20, 2006 (JP) ............... P2006-077081

(51) Int. Cl.
G02B 27/10 (2006.01)
(52) U.S. Cl. ...................................... 359/619
(58) Field of Classification Search ........... 359/619
See application file for complete search history.

(56) References Cited
U.S. PATENT DOCUMENTS
6,958,207 B1 10/2005 Khusnatdinov et al.

2002/0044351 A1 4/2002 Nilsen
2003/0011315 A1 1/2003 Ito et al.
2005/0094277 A1 5/2005 Khusnatdinov et al.

FOREIGN PATENT DOCUMENTS
JP 2002-267815 A 9/2002
JP 2004-219626 A 8/2004
JP 2004-284178 A 10/2004

OTHER PUBLICATIONS

D.G. Stavenga et al., "Light on the moth-eye corneal nipple array of butterflies," Proceedings of the Royal Society B, vol. 273, Dec. 6, 2005, pp. 661-667.
D.S. Hobbs et al., "Design, Fabrication, and Measured Performance of Anti-Reflecting Surface Textures in Infrared Transmitting Materials," Proceedings of SPIE, vol. 5786, No. 1, Mar. 28, 2005, pp. 349-364.

Primary Examiner—Jessica T Stultz
Assistant Examiner—Mahidere S Sahle
(74) Attorney, Agent, or Firm—Foley & Lardner LLP

(57) ABSTRACT

An anti-reflection microstructure including: convex portions arranged at a pitch shorter than a wavelength of visible light, each of the convex portions having a conic shape defined by an apex, a lateral surface, and a base, wherein an intersecting line between the lateral surface and a plane which passes through the apex and is perpendicular to the base, is equivalent to a curve expressed by an nth-order linear formula in which $1 < n \leq 3$.

10 Claims, 5 Drawing Sheets

FORMULA (1)
$$X = (D/2) \times \{1 - (Z/H)^n\}$$

FIG. 2B

FORMULA (2)
$$Z = H - \{H / (D/2)^n\} \times X^n$$

FIG. 4A

$1 < n \leqq 3$

| | Base Material | Surface | Shape of Convex Portion | | | | | | Avg. Reflection rate [%] | Remarks |
|---|---|---|---|---|---|---|---|---|---|---|
| | | | Shape of Base | D [mm] | H [mm] | H/D [-] | Linear Formula Type | Order | | |
| Example 1 | PMMA | Front | Square | 250 | 500 | 2 | Formula (1) | 1.2 | 0.08 | |
| | | Rear | | | | | | | | |
| Example 2 | PMMA | Front | Square | 250 | 750 | 3 | Formula (1) | 1.5 | 0.06 | |
| | | Rear | | | | | | | | |
| Example 3 | PMMA | Front | Square | 300 | 300 | 1 | Formula (1) | 2 | 0.51 | |
| | | Rear | | | | | | | | |
| Example 4 | PMMA | Front | Square | 250 | 500 | 2 | Formula (1) | 3 | 0.57 | |
| | | Rear | | | | | | | | |
| Example 5 | PMMA | Front | Multilayer anti-reflection film | | | | | | 0.77 | |
| | | Rear | Square | 250 | 750 | 3 | Formula (1) | 1.5 | | |
| Example 6 | PMMA | Front | Square | 250 | 750 | 3 | Formula (1) | 1.5 | 0.05 | Ultraviolet ray setting resin is used Circular dents are formed |
| | | Rear | | | | | | | | |
| Example 7 | PMMA | Front | Square | 250 | 750 | 3 | Formula (2) | 2 | 0.03 | |
| | | Rear | | | | | | | | |
| Example 8 | PC | Front | Circular | 250 | 500 | 2 | Formula (2) | 1.5 | 0.18 | |
| | | Rear | | | | | | | | |
| Example 9 | PC | Front | Circular | 250 | 500 | 2 | Formula (2) | 2.5 | 0.39 | |
| | | Rear | | | | | | | | |
| Comparative Example 1 | PMMA | Front | Square | 250 | 500 | 2 | Formula (1) | 0.4 | 1.20 | |
| | | Rear | | | | | | | | |
| Comparative Example 2 | PMMA | Front | Square | 300 | 150 | 0.5 | Formula (1) | 1 | 2.30 | |
| | | Rear | | | | | | | | |
| Comparative Example 3 | PMMA | Front | Multilayer anti-reflection film | | | | | | 3.51 | |
| | | Rear | | | | | | | | |
| Comparative Example 4 | PMMA | Front | Square | 400 | 800 | 2 | Formula (1) | 1 | 1.60 | |
| | | Rear | | | | | | | | |

ANTI-REFLECTION MICROSTRUCTURE, ANTI-REFLECTION MOLD BODY, AND METHOD OF MANUFACTURING THE SAME

BACKGROUND OF THE INVENTION

1. Field of the Invention

The present invention relates to an anti-reflection microstructure having a function for preventing light reflection, to an anti-reflection mold body which includes the anti-reflection microstructure and is suitable for applications as a non-reflective panel for various meters, display devices, etc. to be installed in a vehicle such as an automobile, a ship, or an airplane, and further to a method of manufacturing the anti-reflection mold body.

2. Description of the Related Art

When outside light or room illumination is projected on a screen of a display device such as a liquid crystal display or a CRT display, for example, on a household television screen, visibility of screen images is substantially deteriorated.

In an automobile, a display unit accommodating a variety of indicators such as a speedometer or a fuel gauge is provided in front of a driver's seat. The display unit has a meter front cover fitted to the front thereof. If outside scenes are projected onto the meter front cover through a front windshield or a side windshield, it becomes hard to read the indicators on the display unit. Usually, a meter hood is provided above the meter front cover so as to prevent the projection of outside light onto the cover.

As a typical anti-reflection mold body for preventing the light reflection as described above, a multilayer anti-reflection film made of multiple thin films with mutually different refractive indices is conceived.

Moreover, Japanese Patent Application Laid-open Publication No. 2002-267815 discloses an anti-reflection mold body including a microstructure which has lower reflection rate than such a multilayer anti-reflection film.

This anti-reflection mold body is a transparent formed product having on a surface thereof numerous fine convex portions to change refractive index continuously in the thickness direction thereof. The convex portions are made of a transparent material and formed at a pitch of not exceeding a wavelength of light.

Specifically, the anti-reflection mold body has on the surface thereof a layer of numerous fine convex portions in wave shapes or triangular shapes. Since percentage of the transparent material of the fine convex portions is infinitely close to 0% at the outermost region of the asperity layer, the refractive index therein is virtually equal to a refractive index of air (1.0). Meanwhile, since percentage of air is infinitely close to 0% at the innermost region of the asperity layer, the refractive index therein is virtually equal to a refractive index of the transparent material. Moreover, in an intermediate region of the asperity layer, the refractive index varies within a range from the refractive index of air to the refractive index of the transparent material depending on the percentage of the transparent material or the air at the region.

The anti-reflection mold body thus has the refractive index changing continuously in the thickness direction thereof, which provides the mold body with a superior anti-reflection function to the multilayer anti-reflection film which is formed of stacked thin films having different refractive indices and has the refractive index changing stepwise in the thickness direction thereof.

SUMMARY OF THE INVENTION

However, the fine convex portions in the above-described anti-reflection mold body are typically formed into wave, triangular or trapezoidal shapes. Accordingly, the refractive index of the mold body changes drastically in the thickness direction. As a consequence, this anti-reflection mold body fails in achieving a sufficient anti-reflection effect.

An object of the present invention is to provide an anti-reflection microstructure having a superior anti-reflection function, an anti-reflection mold body including the microstructure, a manufacturing method thereof, and more specifically to provide an automobile component such as a meter front cover or a windshield which includes the anti-reflection microstructure.

An aspect of the present invention is an anti-reflection microstructure comprising: convex portions arranged at a pitch shorter than a wavelength of visible light, each of the convex portions having a conic shape defined by an apex, a lateral surface, and a base, wherein an intersecting line between the lateral surface and a plane which passes through the apex and is perpendicular to the base, is equivalent to a curve expressed by an nth-order linear formula in which $1 < n \leq 3$.

Another aspect of the present invention is a method of manufacturing an anti-reflection mold body comprising: providing an inverse shape of an anti-reflection microstructure on a surface of a die, the anti-reflection microstructure comprising numerous convex portions arranged at a pitch shorter than a wavelength of visible light, each of the convex portions having a conic shape defined by an apex, a lateral surface, and a base, wherein an intersecting line between the lateral surface and a plane which passes through the apex and is perpendicular to the base, is equivalent to a curve expressed by an nth-order linear formula in which $1 < n \leq 3$; and pressing the die against a base material while heating at least any of the die and the base material.

Still another aspect of the present invention is a method of manufacturing an anti-reflection mold body comprising: providing an inverse shape of an anti-reflection microstructure on a surface of a die, the anti-reflection microstructure comprising numerous convex portions arranged at a pitch shorter than a wavelength of visible light, each of the convex portions having a conic shape defined by an apex, a lateral surface, and a base, wherein an intersecting line between the lateral surface and a plane which passes through the apex and is perpendicular to the base, is equivalent to a curve expressed by an nth-order linear formula in which $1 < n \leq 3$; and irradiating an active energy ray while interposing active energy ray setting resin between the die and a base material.

BRIEF DESCRIPTION OF THE DRAWINGS

The invention will now be described with reference to the accompanying drawings wherein.

DESCRIPTION OF THE PREFERRED EMBODIMENTS

An anti-reflection microstructure M of the present invention includes numerous convex portions P which are arranged at a shorter pitch than a wavelength of visible light. Each of the convex portions P has a conic shape which is defined by an apex, a lateral surface, and a base. The base is formed into a polygon or a substantially circular shape.

An intersecting line between the lateral surface and a plane passing through the apex of the convex portion P and being perpendicular to the base, i.e. a ridge line of the lateral surface along a vertical cross section of the convex portion P (a cross section perpendicular to the base) passing through the apex of the convex portion P, which is ranging from the apex to a point on the perimeter of the base, is equivalent to a curve expressed by an nth-order linear formula (in which $1<n\leq 3$).

Figure 2A:
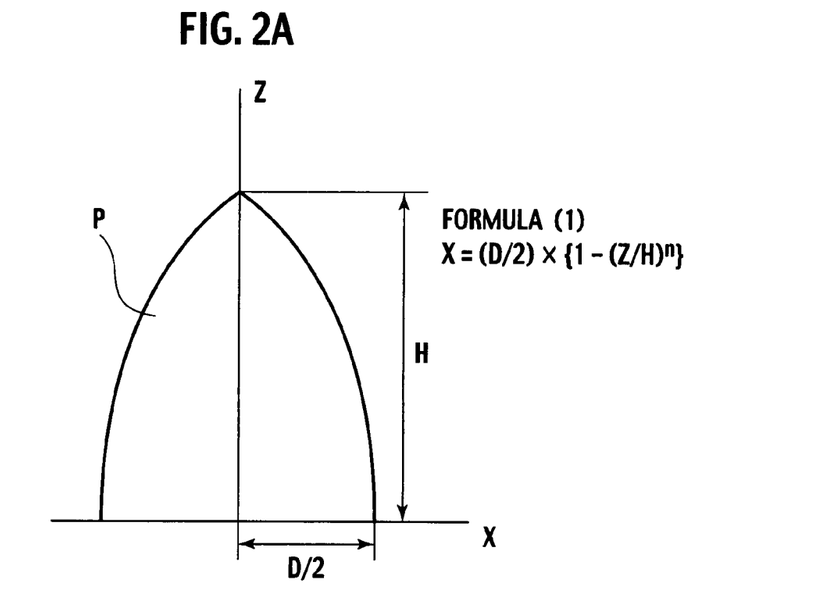
FIG. 2A is a view showing a convex portion in the anti-reflection mold body according to the present invention having a side geometry expressed by an nth-order linear formula $X = (D/2) \times \{1 - (Z/H)^n\}$.
Figure 2B:
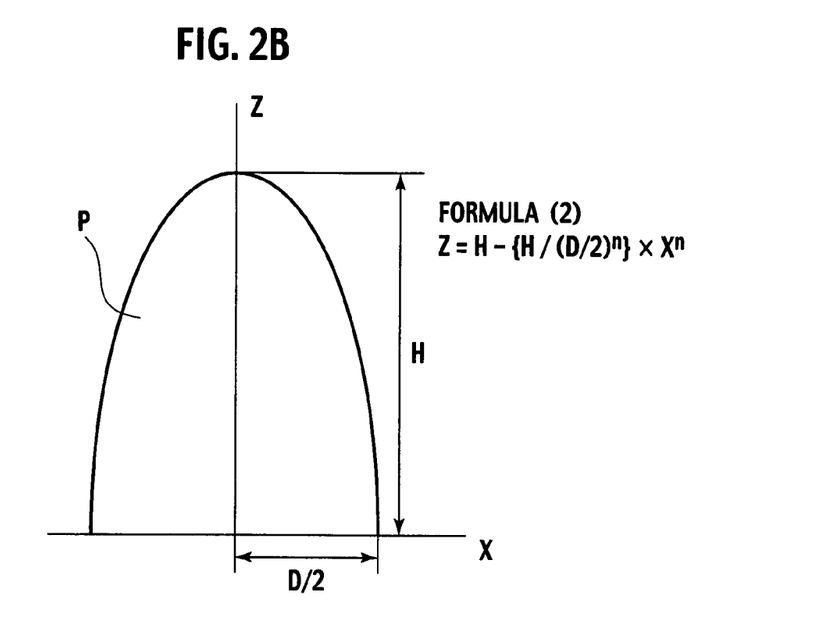
FIG. 2B is a view showing another convex portion in the anti-reflection mold body according to the present invention having a side geometry expressed by an nth-order linear formula $Z=H-\{H/(D/2)^n\}\times X^n$.

As shown in FIG. 2A and FIG. 2B, the plane passing through the apex of the convex portion P and being perpendicular to the base provides a coordinate system in which an axis passing through the apex and being perpendicular to the base is defined as a Z axis, and in which an axis orthogonal to the Z axis at an intersecting point between the Z axis and the base is defined as an X axis. In other words, the base is provided on the X axis while the apex is provided on the Z axis on the vertical cross section which is passing through the apex of the convex portion P. The intersecting line is expressed by one of the following nth-order linear formulae (1) and (2):

$$X=(D/2)\times\{1-(Z/H)^n\} \quad (1)$$

$$Z=H-\{H/(D/2)^n\}\times X^n \quad (2)$$

In this respect, H denotes a distance between the apex and the base, namely, a height of each convex portion P. Meanwhile, D denotes a diameter of a circle which adopts a distance between the point on the perimeter of the base and the Z axis as a radius. If the convex portion P is formed into a right circular conic shape, then D coincides with the diameter of the circle constituting the base.

In a case where the base of the convex portion P is formed into a polygon, D coincides with a diameter of a circumscribed circle of the polygon constituting the base on the vertical cross section containing one of vertexes of the polygon. Moreover, the ridge line of the lateral surface of the convex portion P along the vertical cross section coincides with an edge line that lies between the apex of the convex portion P and one of the vertexes of the base.

Note that, it is also possible to correct the linear formulae (1) or (2) by adding an appropriate constant term depending of a position of the apex or the like.

Figure 3:
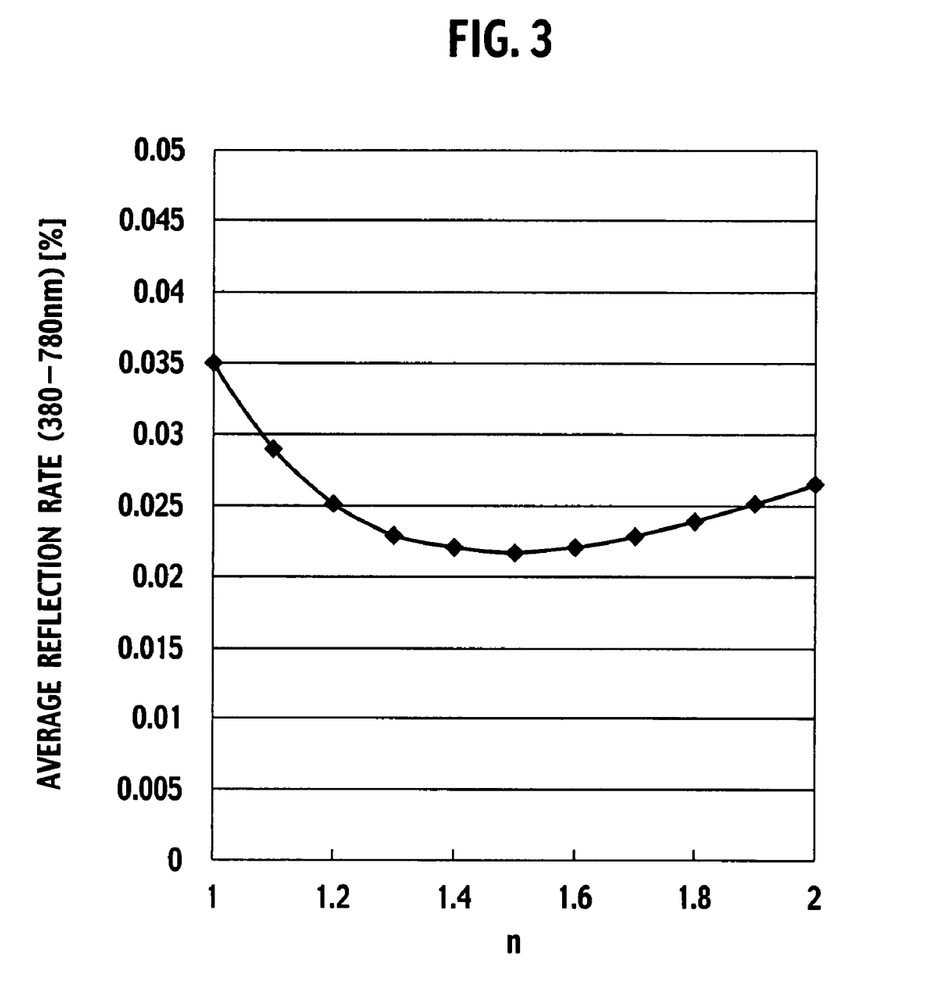
FIG. 3 is a graph showing a relationship between an order n and average reflection rate in a case where the side geometry of the convex portion in the anti-reflection mold body according to the present invention is expressed by an nth-order linear formula.

FIG. 3 shows a relationship between the order n in the linear formula for defining the side geometry of the convex portion P and the average reflection rate in a wavelength range from 380 nm to 780 nm, for a polymethylmethacrylate base material 2 formed on both surfaces thereof with the convex portion P having the height H=750 nm and the diameter of the circle of the base D=250 nm (H/D=3). As it is apparent from FIG. 3, the average reflection rate drops in a range of the order n greater than 1 and equal to or below 3, and marks the minimum value when the order n is approximately equal to 1.5. It is confirmed that the order n indicating the minimum value shifts to a lower value as an aspect ratio (H/D) of the convex portion is reduced.

Note that, the convex portion P having the side geometry in accordance with the linear formula (1) has a pointed apex as shown in FIG. 2A, therefore this convex portion P has a fine mold-releasability in molding the mold body. On the other hand, the convex portion P having the side geometry in accordance with the linear formula (2) has a rounded apex as shown in FIG. 2B, therefore this convex portion P is suitable for an application where a higher scratch resistance is required.

Figure 4A:
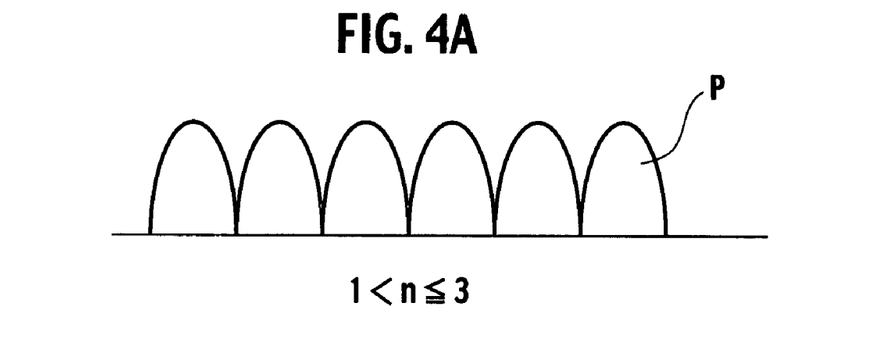
FIGS. 4A to 4C are schematic diagrams showing a variation of the side geometry relative to a change in the order n in a case where the side geometry of the convex portion is expressed by one of the nth-order linear formulae.
Figure 4B:
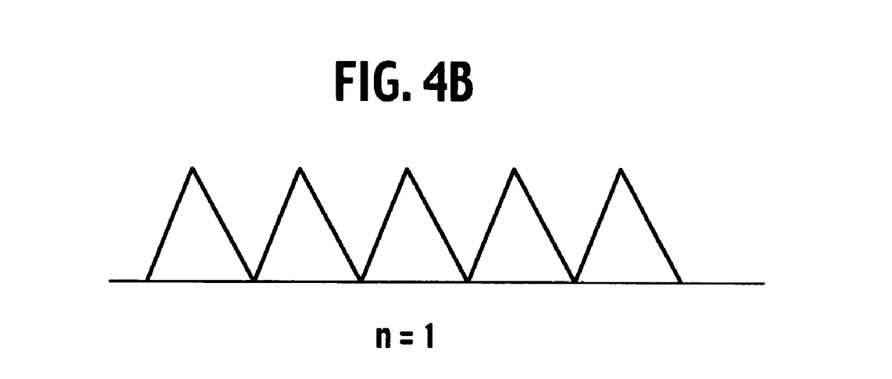
Figure 4C:
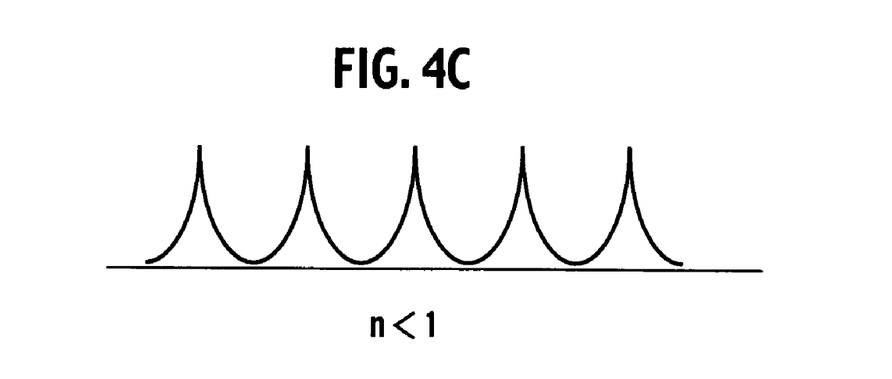
Figure 5:
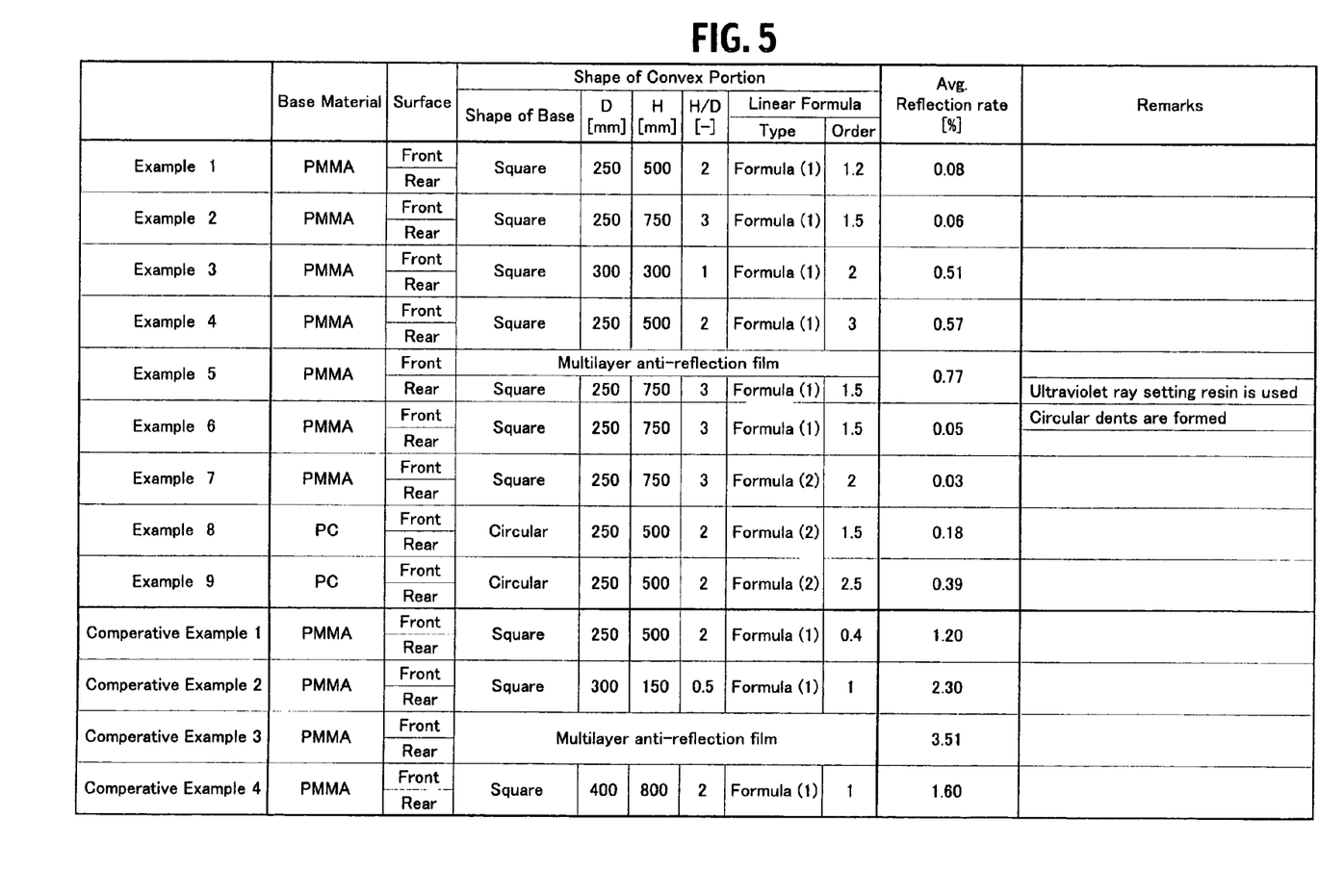
FIG. 5 is a table showing measurement results of reflection rate of examples of the anti-reflection mold body according to the present invention and comparative examples.

FIGS. 4A to 4C schematically show a variation of the side geometry in response to a change in the order n when the side geometry of the convex portion P is expressed by one of the above-described nth-order linear formulae. When the order n exceeds 1, the lateral surface of the convex portion P bulges out as shown in FIG. 4A, whereby each shape of the projection P is formed into a bell shape. Although the above-mentioned effect of the present invention is available when the order n is in the range $1<n\leq 3$ as described previously, it is particularly preferable to set the value of the order n in a range from 1.1 to 2.5. It is more preferable to set the value of the order n in a range from 1.2 to 2.

Incidentally, when the order n is equal to 1, the convex portion P is formed into a circular cone or a pyramid cone as shown in FIG. 4B. The contour shape of the side surface along the vertical cross section is expressed as straight lines.

Moreover, when the order n is smaller than 1, the lateral surface of the projection is formed into a concave shape which is dented inward in the diameter direction, as shown in FIG. 4C.

Note that, the "cone" originally means a shape/form that includes a locus of all line segments connecting between an apex and points on the perimeter of a base as a lateral surface. In other words, the "cone" originally means a pyramid cone having flat lateral surfaces or a circular cone having generating lines. Meanwhile, in the present invention, the "convex portion" means a shape/form in which a lateral surface has the contour shape as shown in FIG. 4A along the vertical cross section. To be more precise, when the base is formed as a polygon, the lateral surface of the convex portion defines a two-dimensional curved surface. Meanwhile, when the base is formed as a circle or an ellipse, the lateral surface of the convex portion defines a three-dimensional curved surface.

Here, the shape of the base of the convex portion is not particularly limited. In this context, it is possible to adopt polygons, a circle, an ellipse, an ovoid, and so forth as the shape of the base. Typically, it is preferable to adopt an isotropic surface, or to adopt any of an equilateral triangle, a square or a regular hexagon when considering arrangement of the convex portions on a flat surface without providing gaps between the projections.

Note that, in a case where the convex portion P is formed into a right circular cone, the cross-sectional shape of the projection P becomes constant, and the contour shape of the lateral surface also becomes constant irrespective of the direction of vertical cross section. In contrast, in a case where the convex portion P is formed into a right polygonal pyramid cone and where the base is a polygon, the cross-sectional shape of the projection P becomes different and the contour shape of the lateral surface also becomes different depending on the direction of the vertical cross section. In the case of the convex portion P having the right polygonal pyramid shape, the order n in the linear formula expressing the side geometry is only needed to satisfy the value within the above-described range on at least one vertical cross section.

A ratio H/D between the height H of the convex portion P and the diameter D of the circle of the base is set preferably in a range from 1 to 3 inclusive. The reasons are as follows. If the ratio H/D is below 1, the anti-reflection effect is substantially deteriorated. In contrast, if the ratio H/D exceeds 3, there is very little change in the anti-reflection effect no matter how much the ratio H/D is increased.

Meanwhile, the diameter D of the circle of the base is preferably set greater than 50 nm but less than 380 nm. The reasons are as follows. From industrial point of view it is extremely difficult to obtain a microstructure having the diameter D equal to or below 50 nm. On the other hand, the anti-reflection effect is not obtained if the diameter D is set equal to or above 380 nm that is equivalent to the shortest wavelength in the visible light range.

Figure 1A:
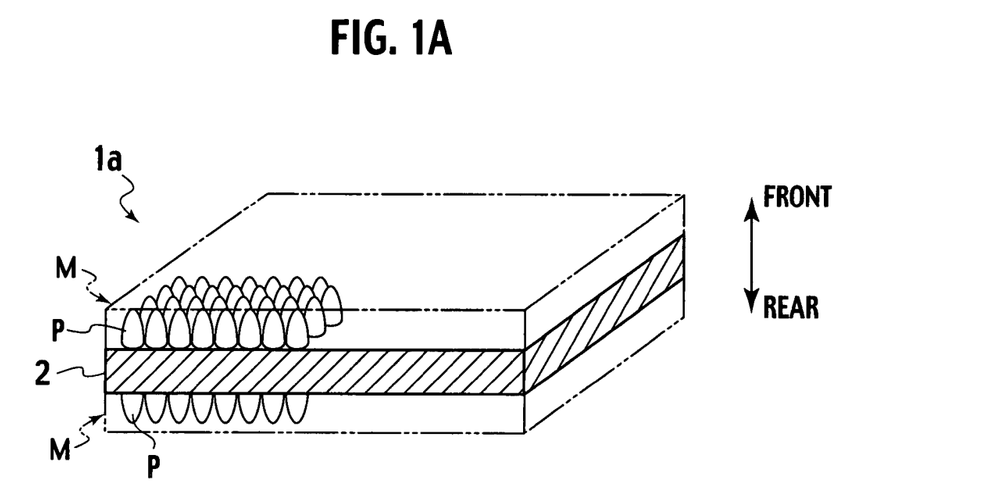
FIG. 1A is a view showing an example of an anti-reflection mold body according to the present invention.
Figure 1B:
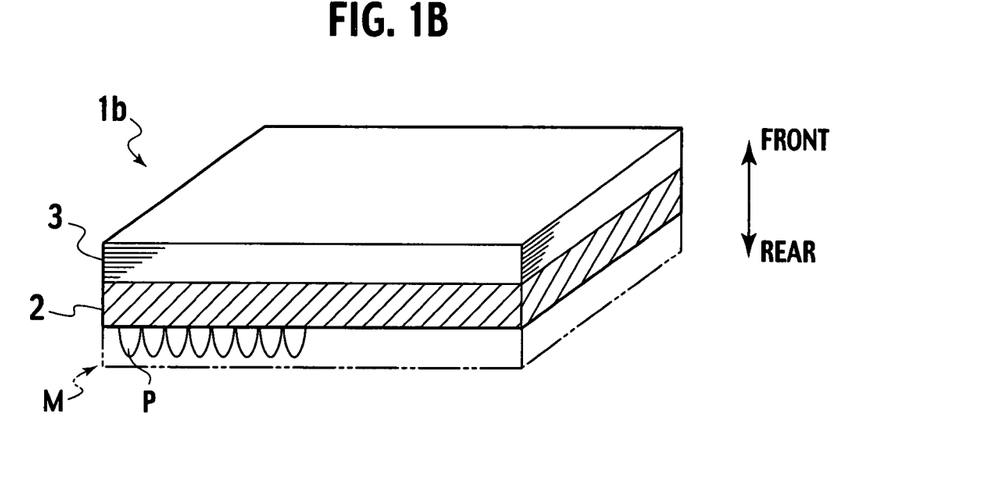
FIG. 1B is a view showing another example of the anti-reflection mold body according to the present invention.

An anti-reflection mold body $1a$, $1b$ can be obtained by forming the anti-reflection microstructure M of the present invention, typically on one surface or preferably on both surfaces of a transparent base material 2 as shown in FIG. 1A or 1B. By providing the anti-reflection mold body $1a$, $1b$ to panels of various display devices and to transparent panels such as show windows or display cases, it is possible to prevent reflection of outside light or room illumination and thereby to improve visibility of images, display articles, and exhibits inside.

Moreover, similar anti-reflection effects can be obtained by providing the anti-reflection mold body $1a$, $1b$ to various vehicle components as represented by automobiles such as window glass, roof glass, meter front covers, head lamps, rear finishers or films used for screens of display devices such as liquid crystal display devices.

The anti-reflection mold body $1b$ has the anti-reflection microstructure M on one of surfaces of a base material 2 thereof and has a multilayer reflective film 3 on the other surface thereof as shown in FIG. 1B. Although the anti-reflection mold body $1b$ formed as described above has a slightly poorer anti-reflection function than the anti-reflection mold body $1a$ having the anti-reflection microstructures M on both surfaces thereof, it is possible to prevent scratches on the anti-reflection microstructure M by placing the multilayer anti-reflection film 3 on outer side.

An apparatus for manufacturing the anti-reflection mold body $1a$, $1b$ of the present invention has a die provided on a die surface thereof with an inverse shape of the anti-reflection microstructure M of the present invention having the numerous fine convex portions P, and presses the die and a base material 2 together while heating one or both of the die and the base material 2, thereby forming the microstructure M on the surface of the base material 2. Alternatively, the anti-reflection mold body $1a$, $1b$ may be manufactured by irradiating an active energy ray while interposing active energy ray setting resin between the die and the base material 2 to cure the resin, and thereby forming the microstructure M on the surface of the base material 2.

Typically, the base material 2 is preferably made of a material having transparency. For example, it is possible to use thermoplastic resins such as polymethylmethacrylate, polymethylacrylate, polyethylene, polypropylene, polyvinyl alcohol, polyvinylidene chloride, polyethylene terephthalate, polyvinyl chloride, polystyrene, acrylonitrile butadiene styrene (ABS) resin, acrylonitrile styrene (AS) resin, acrylic resin, polyamide, polyacetal, polybutylene terephthalate, glass fiber reinforced polyethylene terephthalate, polycarbonate, modified polyphenylene ether, polyphenylene sulfide, polyetheretherketone, liquid crystal polymers, fluororesin, polyarylate, polysulfone, polyethersulfone, polyamideimide, polyetherimide or thermoplastic polyimide, thermosetting resins such as phenol resin, melamine resin, urea resin, epoxy resin, unsaturated polyester resin, alkyd resin, silicone resin, diallyl phthalate resin, polyamidebismaleimide or polybisamidetriazole, and a material prepared by blending two or more resins cited above.

Meanwhile, the active energy ray setting resin which starts polymerization for curing upon irradiation of ultraviolet rays or the like may include ultraviolet ray setting acrylurethane resin, ultraviolet ray setting polymethylmethacrylate, ultraviolet ray setting polymethylacrylate, ultraviolet ray setting polyesteracrylate resin, ultraviolet ray setting epoxyacrylate resin, ultraviolet ray setting polyolacrylate resin, and ultraviolet ray setting epoxy resin. Here, it is also possible to use a polymerization initiator for generating radicals by irradiating the active energy ray, and to add a curing agent such as isocyanate to enhance curing when appropriate.

Note that, the active energy ray used herein may generally include, but without limitation to, ultraviolet rays, X-rays, electron beams, electromagnetic waves, and the like.

Meanwhile, inorganic transparent materials such as glasses can also be used as the base material 2. In this case, the microstructure M is formed on a surface of the base material 2 by cutting the glass surface with an electron beam or by pouring a melted inorganic transparent material into a mold having an inverse shape of the anti-reflection microstructure M of the present invention. It is also possible to form the microstructure M on both surfaces of the base material 2 by pouring the melted inorganic transparent material into the mold and then pressing a die having the same inverse shape of the anti-reflection microstructure M against the base material 2 before it cools down.

As described above, in the anti-reflection microstructure M of the present invention, the side geometry of the convex portion P was formed into the shape in which the intersecting line between the lateral surface and the plane passing through the apex of the convex portion P and being perpendicular to the base, i.e. the ridge line of the lateral surface in a vertical cross section of the convex portion P passing through the apex of the convex portion P, which was ranging from the apex to a point on the perimeter of the base, was expressed by the nth-order linear formula (in which $1 < n \leq 3$). Accordingly, geometrical occupancy/existence ratio of the base material 2 of the microstructure M (percentage of the cross-sectional areas of the convex portions P in a cross section perpendicular to the thickness direction of the microstructure M) changes smoothly and linearly in the thickness direction of the microstructure M, specifically in the direction from the outermost layer (the region where the apexes of the respective convex portions P are located) to the innermost layer (the region where the bottom portions of the respective convex portions P are located). Thus, the refractive index of the microstructure M determined from the geometrical occupancy/existence ratio of the material thereof also changes smoothly and linearly in the thickness direction within the range from the refractive index of air (1.0) to the refractive index of the base material 2. Therefore, the incident light on the microstructure M goes straight therethrough with very little diffraction or reflection. Eventually, the light reflection rate on the incident surface is effectively reduced.

Moreover, since the anti-reflection mold body 1a, 1b of the present invention has the anti-reflection microstructure M on the surface of the base material 2 thereof, the light reflection therefrom is suppressed to an extremely low level. The anti-reflection mold body 1a, 1b can be provided to various components of automobiles and the like, such as a meter front cover, and prevents the reflection of the projected image of outside scenes and the like, thereby realizing a hoodless meter without a meter hood.

Now, concrete examples to which the present invention is applied will be described below. Note that, in the following examples, the edge line of the convex portion is taken as a representative of the side geometry of the convex portion P.

EXAMPLE 1

A die was fabricated by use of a commercially available electron beam lithography system. This die was heated up to 150° C., and then pressed against both surfaces of a polymethylmethacrylate base material at a pressure of 10 MPa for 1 hour. Thereafter, the base material was cooled down to 70° C. or below. In this way, an anti-reflection mold body was fabricated, provided with anti-reflection microstructures M where the fine convex portions P are arranged in a hexagonal close-packed structure. The convex portion P had a square base, a diameter D of a circumscribed circle thereof equal to 250 nm, and a height H equal to 500 nm (H/D=2). An edge line shape thereof was expressed by the 1.2th order linear formula (1).

The anti-reflection mold body thus obtained was subjected to measurement of average reflection rate at a light incident angle of 0 degrees and in a wavelength range from 380 to 780 nm by use of a multi-angle spectrophotometer (made by Otsuka Electronics, Co., Ltd.). The average reflection rate was equal to 0.08%.

EXAMPLE 2

By repeating the same operations as Example 1, another die was fabricated by use of the same electron beam lithography system. Using the die, an anti-reflection mold body was fabricated, provided with anti-reflection microstructures M in which the fine convex portions P are arranged in a hexagonal close-packed structure, on both surfaces of the polymethylmethacrylate base material. The convex portion P had a square base, a diameter D of a circumscribed circle thereof equal to 250 nm, and a height H equal to 750 nm (H/D=3). An edge line shape thereof was expressed by the 1.5th order linear formula (1).

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 0.06%.

EXAMPLE 3

By repeating the same operations as Example 1, another die was fabricated by use of the same electron beam lithography system. Using the die, an anti-reflection mold body was fabricated, provided with anti-reflection microstructures M where the fine convex portions P are arranged in a hexagonal close-packed structure on both surfaces of the polymethylmethacrylate base material. The convex portion P had a square base, a diameter D of a circumscribed circle thereof equal to 300 nm, and a height H equal to 300 nm (H/D=1). An edge line shape thereof was expressed by the second order linear formula (1).

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 0.51%.

EXAMPLE 4

By repeating the same operations as Example 1, another die was fabricated by use of the same electron beam lithography system. Using the die, an anti-reflection mold body was fabricated, provided with anti-reflection microstructures M where the fine convex portions P are arranged in a hexagonal close-packed structure on both surfaces of the polymethylmethacrylate base material. The convex portion P had a square base, a diameter D of a circumscribed circle thereof equal to 250 nm, and a height H equal to 500 nm (H/D=2). An edge line shape thereof was expressed by the third order linear formula (1).

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 0.57%.

EXAMPLE 5

The die fabricated in Example 2 was used herein. ultraviolet ray setting resin was interposed between the die and a base material, and ultraviolet rays were irradiated thereon. In this way, an anti-reflection microstructure M where the fine convex portions P having the same geometry as that in Example 2 are arranged in a hexagonal close-packed structure, was formed on a rear surface of the polymethylmethacrylate substrate material. Subsequently, a multilayer anti-reflection film 3 consisting of seven layers was formed on the front surface of the base material by sequentially vapor-depositing a first layer having a film thickness of 181.9 nm and a refractive index of 1.38, a second layer having a film thickness of 12.8 nm and a refractive index of 2.5, a third layer having a film thickness of 34.9 nm and a refractive index of 1.45, a fourth layer having a film thickness of 37.4 nm and a refractive index of 2.5, a fifth layer having a film thickness of 22.3 nm and a refractive index of 1.45, a sixth layer having a film thickness of 28.6 nm and a refractive index of 2.5, and a seventh layer having a film thickness of 97.1 nm and a refractive index of 1.38 in the order of closeness to the base material.

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 0.77%.

EXAMPLE 6

The die fabricated in Example 2 was used herein. By repeating the same operations as Example 2, an anti-reflection microstructure M was fabricated, provided with the fine convex portions P having the same geometry as that in Example 2 arranged in a hexagonal close-packed structure on both surfaces of the polymethylmethacrylate base material. Subsequently, circular dents each having a diameter of 2 μm and a depth of 1 μm were formed at random only on the front surface of the base material so as to adjust the area occupancy on the relevant surface of the dents equal to 2%.

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 0.05%.

EXAMPLE 7

By repeating the same operations as Example 1, another die was fabricated by use of the same electron beam lithography system. Using the die, an anti-reflection mold body was fabricated, provided with anti-reflection microstructures M where the fine convex portions P are arranged in a hexagonal close-packed structure on both surfaces of the polymethylmethacrylate base material. The convex portion P had a square base, a diameter D of a circumscribed circle thereof equal to 250 nm, and a height H equal to 750 nm (H/D=3). An edge line shape thereof was expressed by the second order linear formula (2).

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 0.03%.

EXAMPLE 8

Another die was fabricated by use of the same electron beam lithography system as Example 1. By repeating the same operations as Example 1 except for changing the die heating temperature to 170° C., an anti-reflection mold body was fabricated, provided with anti-reflection microstructures M where the fine convex portions P are arranged in a hexagonal close-packed structure on both surfaces of the polymethylmethacrylate base material. The convex portion P had a circular base, a diameter D of the base equal to 250 nm, and a height H equal to 500 nm (H/D=2). An edge line shape thereof was expressed by the 1.5th order linear formula (2).

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 0.18%.

EXAMPLE 9

Another die was fabricated by use of the same electron beam lithography system as Example 1. By repeating the same operations as Example 1 except for changing the die heating temperature to 170° C., an anti-reflection mold body was fabricated, provided with anti-reflection microstructures M where the fine convex portions P are arranged in a hexagonal close-packed structure on both surfaces of the polymethylmethacrylate base material. The convex portion P had a circular base, a diameter D of the base equal to 250 nm, and a height H equal to 500 nm (H/D=2). An edge line shape thereof was expressed by the 2.5th order linear formula (2).

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 0.39%.

COMPARATIVE EXAMPLE 1

By repeating the same operations as Example 1, another die was fabricated by use of the same electron beam lithography system. Using the die, an anti-reflection mold body was fabricated, provided with anti-reflection microstructures where the fine convex portions P are arranged in a hexagonal close-packed structure on both surfaces of the polymethylmethacrylate base material. The convex portion P had a square base, a diameter D of a circumscribed circle thereof equal to 250 nm, and a height H equal to 500 nm (H/D=2). An edge line shape thereof was expressed by the 0.4th order linear formula (1).

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 1.20%.

COMPARATIVE EXAMPLE 2

By repeating the same operations as Example 1, another die was fabricated by use of the same electron beam lithography system. Using the die, an anti-reflection mold body was fabricated, provided with anti-reflection microstructures where the fine convex portions P are arranged in a hexagonal close-packed structure on both surfaces of the polymethylmethacrylate base material. The convex portion P had a square base, a diameter D of a circumscribed circle thereof equal to 300 nm, and a height H equal to 150 nm (H/D=0.5). An edge line shape thereof was expressed by the first order linear formula (1).

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 2.30%.

COMPARATIVE EXAMPLE 3

Multilayer anti-reflection films 3, each having the same configuration as the seven layer anti-reflection film 3 of Example 5, which was formed on the front surface in Example 5, were formed on both surfaces of a polymethylmethacrylate base material.

An anti-reflection mold body provided with the obtained multilayer anti-reflection films 3 was subjected to measurement of average reflection rate at the light incident angle of 0 degrees and in the wavelength range from 380 nm to 780 nm by use of the same multi-angle spectrophotometer. The average reflection rate was equal to 3.51%.

COMPARATIVE EXAMPLE 4

By repeating the same operations as Example 1, another die was fabricated by use of the same electron beam lithography system. Using the die, an anti-reflection mold body was fabricated, provided with anti-reflection microstructures where the fine convex portions P are arranged in a hexagonal close-packed structure on both surfaces of the polymethylmethacrylate base material. The convex portion P had a square base, a diameter D of a circumscribed circle thereof equal to 400 nm, and a height H equal to 800 nm (H/D=2). An edge line shape thereof was expressed by the first order linear formula (1).

The anti-reflection mold body thus obtained was subjected to measurement of average reflection rate at the light incident angle of 0 degrees and in the wavelength range from 380 nm to 780 nm by use of the same multi-angle spectrophotometer. The average reflection rate was equal to 1.6%.

Table 1 collectively shows the above results together with the other data of the anti-reflection microstructures.

It was confirmed that the average reflection rate was drastically reduced in the cases of anti-reflection mold bodies of Examples 1 to 9 provided with the anti-reflection microstructures having the above-described dimensions and shapes, in comparison with those of Comparative Example 1 which provided the low order to the linear formula representing the edge line shape, Comparative Example 2 which provided the low H/D ratio, Comparative Example 3 including the multilayer anti-reflection films 3 on both surfaces, and Comparative Example 4 in which the diameter D of the circle circumscribed to the base of the convex portion was greater than the shortest wavelength of the visible light.

Note that, although the average reflection rate in the wavelength range from 380 nm to 780 nm was equal to 1.6%, in the case of the mold body of Comparative Example 4 where the convex portions were arranged at a pitch of 400 nm between the apexes which was longer than the shortest wavelength of the visible light, it was confirmed that there was a tendency, in particular, of an increase in reflection rate of the shortwave light.

Note that, it is to be understood that the above-described examples merely represent typical examples, and that the present invention is not limited only to these examples. The above description is based on the assumption that the shape of the convex portion is the right cone in which the foot of the perpendicular drawn from the apex to the base coincides with the gravity center of the base. Instead, the shape of the convex portion may be an oblique cone in which the foot of the perpendicular drawn from the apex to the base does not coincide with the gravity center of the base.

It is to be also understood that appropriate combinations of the above-described examples as well as modifications and alterations within the technical scope of the present invention shall be encompassed by the spirit and scope of the present invention as defined by the appended claims.

The present disclosure relates to subject matters contained in Japanese Patent Application No. 2006-077081, filed on Mar. 20, 2006, the disclosures of which is expressly incorporated herein by reference in its entirety.

What is claimed is:

1. An anti-reflection structure comprising:
convex portions arranged at a pitch shorter than a wavelength of visible light, each of the convex portions having a conic shape defined by an apex, a lateral surface, and a base,
wherein assuming that a plane, which passes through the apex and is perpendicular to the base, provides a coordinate system in which an axis passing through the apex and being perpendicular to the base is defined as a Z axis, and in which an axis orthogonal to the Z axis at an intersecting point between the Z axis and the base is defined as an X axis, an intersecting line between the lateral surface and the plane passing through the apex and being perpendicular to the base, is equivalent to a curve expressed by:

$X=(D/2)\times\{1-(Z/H)^n\}$, in which H is a distance between the apex and the base, in which D is a diameter of a circle which adopts a distance between a point on the perimeter of the base and the Z axis as a radius, and in which $1<n\leq 3$.

2. An anti-reflection structure comprising:
convex portions arranged at a pitch shorter than a wavelength of visible light, each of the convex portions having a conic shape defined by an apex, a lateral surface, and a base,
wherein assuming that a plane, which passes through the apex and is perpendicular to the base, provides a coordinate system in which an axis passing through the apex and being perpendicular to the base is defined as a Z axis, and in which an axis orthogonal to the Z axis at an intersecting point between the Z axis and the base is defined as an X axis, an intersecting line between the lateral surface and the plane passing through the apex and being perpendicular to the base, is equivalent to a curve expressed by:

$Z=H-\{H/(D/2)^n\}\times X^n$, in which H is a distance between the apex and the base, in which D is a diameter of a circle which adopts a distance between a point on the perimeter of the base and the Z axis as a radius, and in which $1<n\leq 3$.

3. The anti-reflection structure according to claim 1, wherein the distance H and the diameter D satisfy relationships expressed by: 50 nm<D<380 nm; and $1\leq H/D\leq 3$.

4. The anti-reflection structure according to claim 2, wherein the distance H and the diameter D satisfy relationships expressed by: 50 nm<D<380 nm; and $1\leq H/D\leq 3$.

5. An anti-reflection mold body comprising:
an anti-reflection structure provided at least on one of surfaces of a base material,
wherein the anti-reflection structure comprises convex portions arranged at a pitch shorter than a wavelength of visible light, each of the convex portions having a conic shape defined by an apex, a lateral surface, and a base,
wherein assuming that a plane, which passes through the apex and is perpendicular to the base, provides a coordinate system in which an axis passing through the apex and being perpendicular to the base is defined as a Z axis, and in which an axis orthogonal to the Z axis at an intersecting point between the Z axis and the base is defined as an X axis, an intersecting line between the lateral surface and the plane passing through the apex and being perpendicular to the base, is equivalent to a curve expressed by:

$X=(D/2)\times\{1-(Z/H)^n\}$, in which H is a distance between the apex and the base, in which D is a diameter of a circle which adopts a distance between a point on the perimeter of the base and the Z axis as a radius, and in which $1<n\leq 3$.

6. The anti-reflection mold body according to claim 5, wherein the base material is transparent.

7. The anti-reflection mold body according to claim 6, further comprising a multilayer anti-reflection film provided on another surface of the base material.

8. An automobile component comprising:
an anti-reflection structure comprising convex portions arranged at a pitch shorter than a wavelength of visible light, each of the convex portions having a conic shape defined by an apex, a lateral surface, and a base,
wherein assuming that a plane, which passes through the apex and is perpendicular to the base, provides a coordinate system in which an axis passing through the apex and being perpendicular to the base is defined as a Z axis, and in which an axis orthogonal to the Z axis at an intersection point between the Z axis and the base is defined as an X axis, an intersecting line between the lateral surface and the plane passing through the apex and being perpendicular to the base, is equivalent to a curve expressed by:

$X=(D/2)\times\{1-(Z/H)^n\}$, in which H is a distance between the apex and the base, in which D is a diameter of a circle which adopts a distance between a point on the perimeter of the base and the Z axis as a radius, and in which $1<n\leq3$.

9. A method of manufacturing an anti-reflection mold body comprising:

provide an inverse shape of an anti-reflection structure on a surface of a die, wherein the anti-reflection structure comprises convex portions arranged at a pitch shorter than a wavelength of visible light, each of the convex portions having a conic shape defined by an apex, a lateral surface, and a base, wherein assuming that a plane, which passes through the apex and is perpendicular to the base, provides a coordinate system in which an axis passing through the apex and being perpendicular to the base is defined as a Z axis, and in which an axis orthogonal to the Z axis at an intersecting point between the Z axis and the base is defined as an X axis, an intersecting line between the lateral surface and the plane passing through the apex and being perpendicular to the base, is equivalent to a curve expressed by:

$X=(D/2)\times\{1-(Z/H)^n\}$, in which H is a distance between the apex and the base, in which D is a diameter of a circle which adopts a distance between a point on the perimeter of the base and the Z axis as a radius, and in which $1<n\leq3$; and pressing the die against a base material while heating at least any of the die and the base material.

10. A method of manufacturing an anti-reflection mold body comprising:

providing an inverse shape of an anti-reflection structure on a surface of a die, wherein the anti-reflection structure comprises convex portions arranged at a pitch shorter than a wavelength of visible light, each of the convex portions having a conic shape defined by an apex, a lateral surface, and a base, wherein assuming that a plane, which passes through the apex and is perpendicular to the base, provides a coordinate system in which an axis passing through the apex and being perpendicular to the base is defined as a Z axis, and in which an axis orthogonal to the Z axis at an intersecting point between the Z axis and the base is defined as an X axis, an intersecting line between the lateral surface and the plane passing through the apex and being perpendicular to the base, is equivalent to a curve expressed by:

$X=(D/2)\times\{1-(Z/H)^n\}$, in which H is a distance between the apex and the base, in which D is a diameter of a circle which adopts a distance between a point on the perimeter of the base and the Z axis as a radius, and in which $1<n\leq3$; and irradiating an active energy ray while interposing active energy ray setting resin between the die and a base material.

* * * * *